Aug. 11, 1942.  W. C. PFEIFFER  2,292,544
CLUTCH
Filed Feb. 23, 1939  4 Sheets-Sheet 1
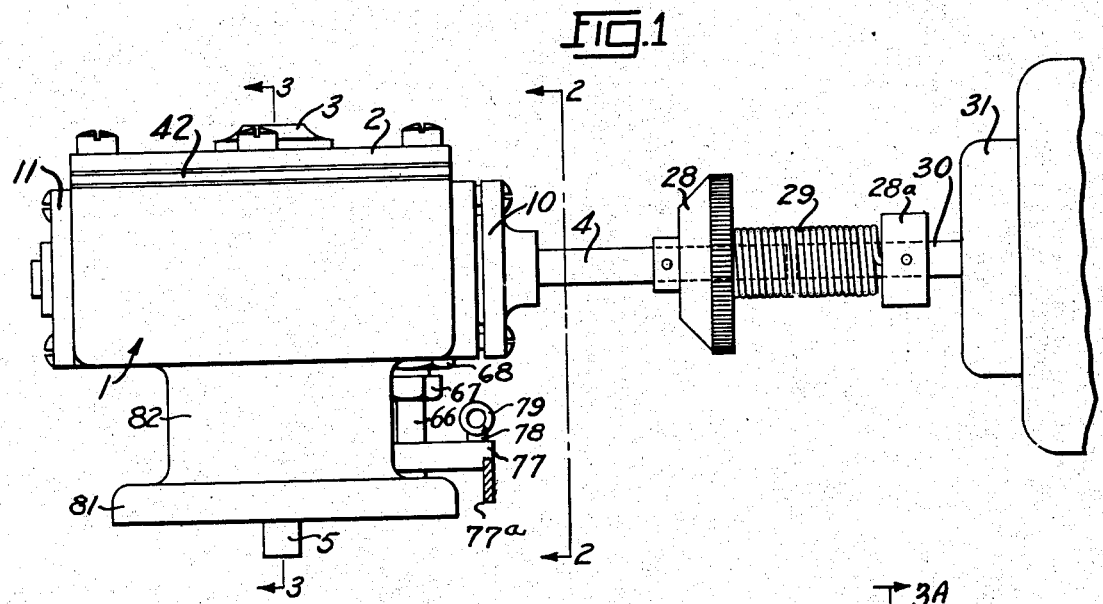
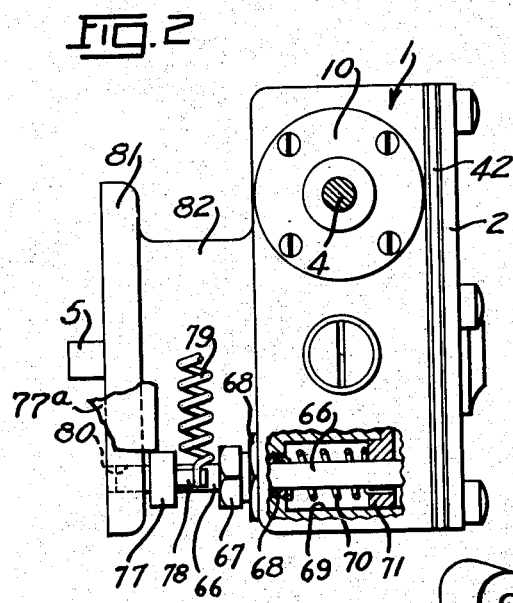
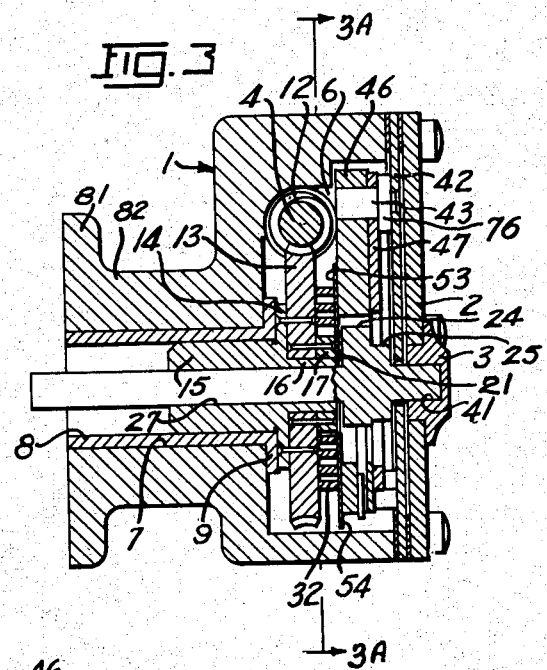
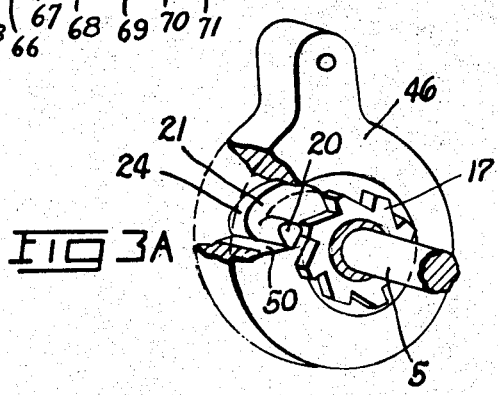
Inventor
WILLIAM C. PFEIFFER
By
Toulmin & Toulmin
Attorneys

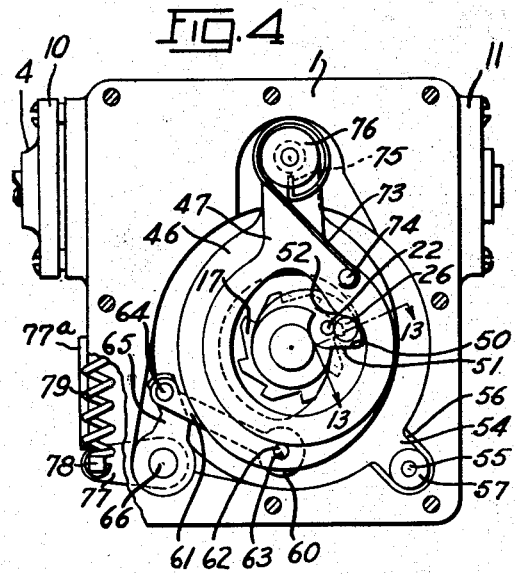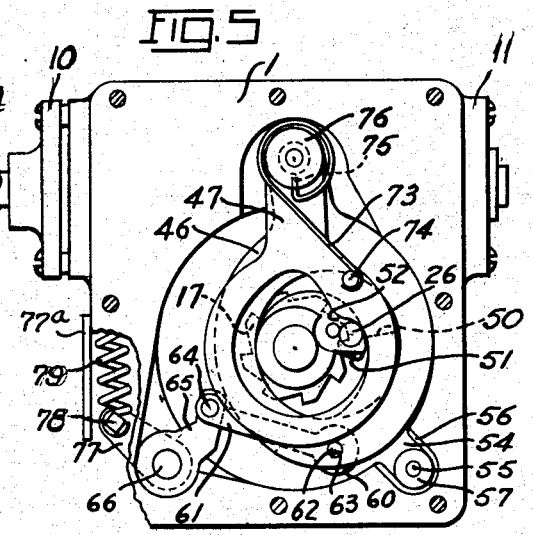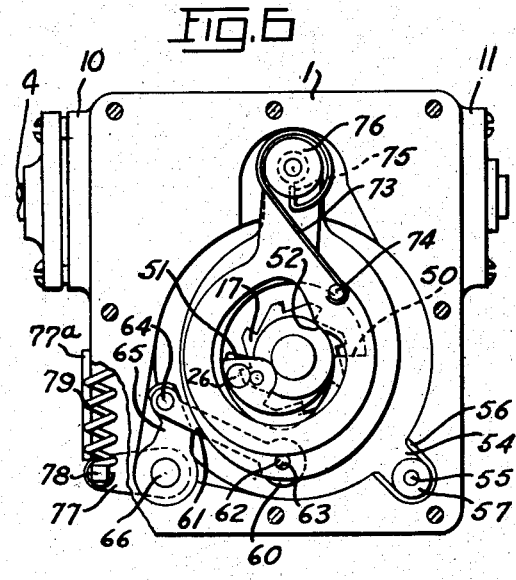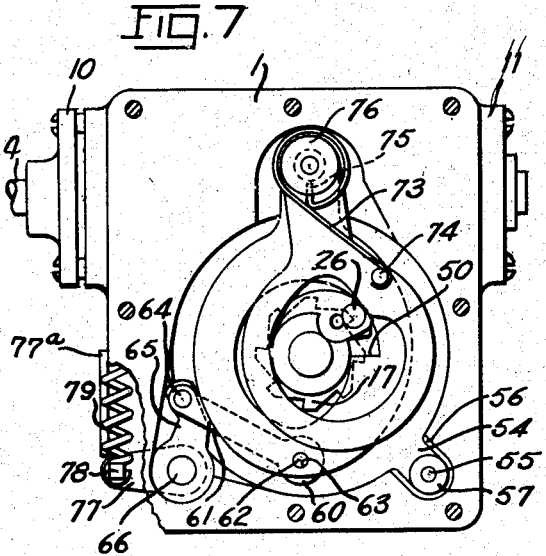

Aug. 11, 1942.   W. C. PFEIFFER   2,292,544
CLUTCH
Filed Feb. 23, 1939   4 Sheets-Sheet 3
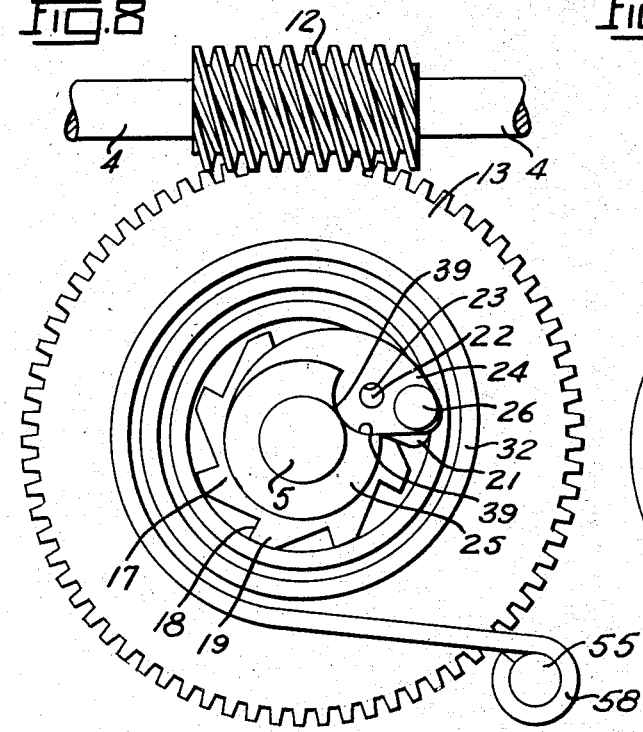
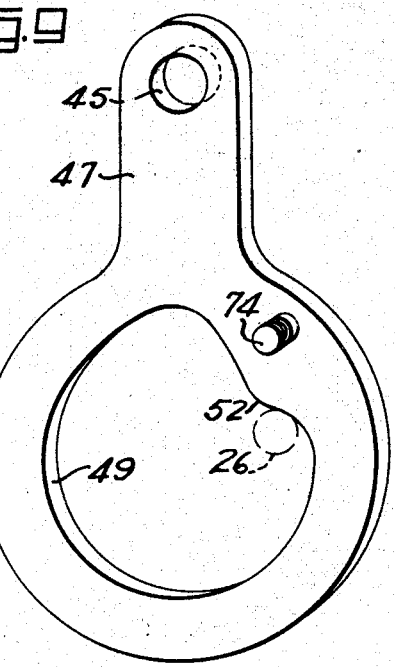
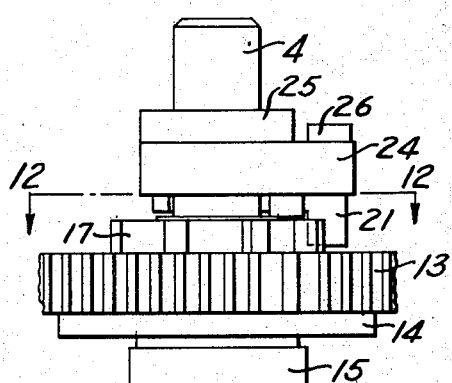
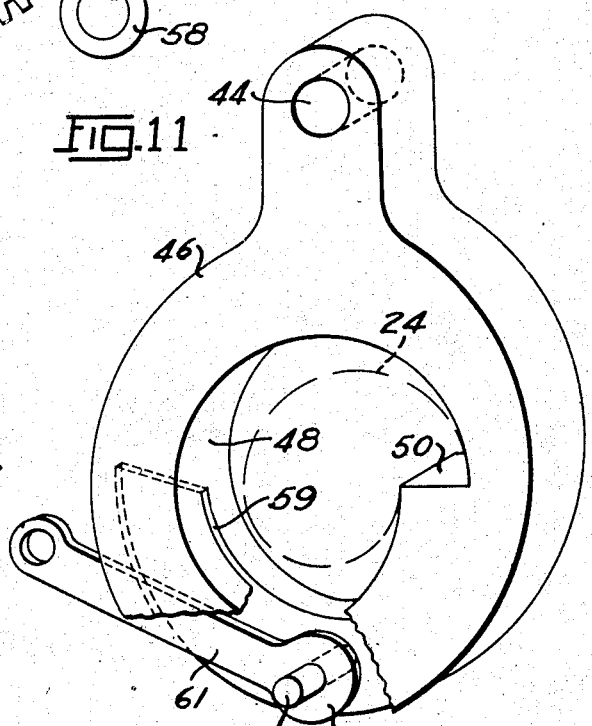
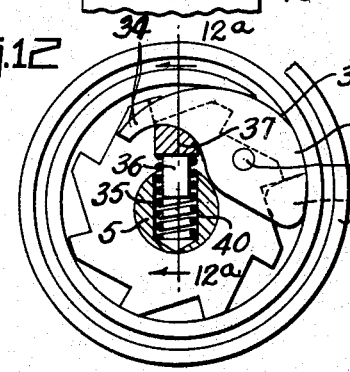
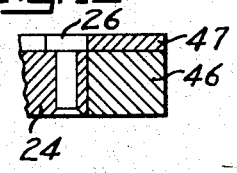
Inventor
WILLIAM C. PFEIFFER
By
Toulmin & Toulmin
Attorneys

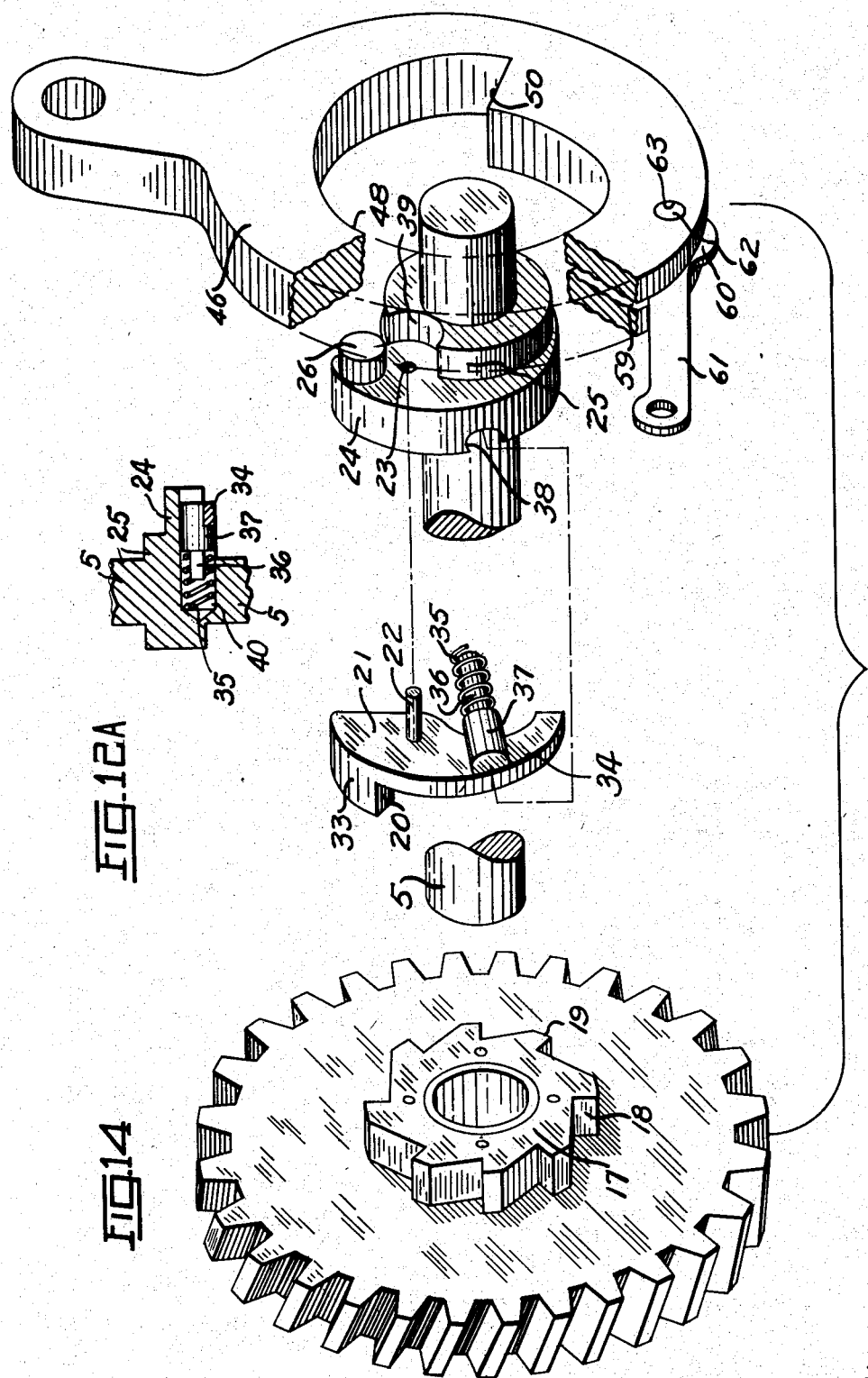

Patented Aug. 11, 1942

2,292,544

UNITED STATES PATENT OFFICE 2,292,544

CLUTCH

William C. Pfeiffer, Dayton, Ohio, assignor to The Egry Register Company, Dayton, Ohio, a corporation of Ohio Application February 23, 1939, Serial No. 258,015

10 Claims. (Cl. 192—28)

This invention relates to clutches, and in particular, to clutch mechanisms for controlling the rotation of a shaft by predetermined amount, followed by a halt.

One object of this invention is to provide a clutch, the mechanism of which causes the clutch output shaft to rotate a predetermined amount and then halt.

Another object is to provide a clutch having a continuously rotatable input shaft and an output shaft which is controlled by the clutch mechanism so as to rotate a predetermined amount, and then come to a halt automatically when the clutch is actuated.

Another object is to provide a clutch of the above-described type, wherein the clutch mechanism automatically returns the clutch-actuating member to its starting position during the operating cycle of the clutch.

Another object is to provide a clutch having a continuously rotatable input shaft and ratchet mechanism connecting the input shaft with the output shaft, the pawl of the ratchet mechanism being disconnectible automatically from the ratchet so as to halt the operation of the clutch output shaft when the latter has rotated a predetermined amount, such as for example, a single revolution.

In the drawings:

Figure 1 is a top plan view of the preferred embodiment of the clutch of this invention.

Figure 2 is a vertical section along the line 2—2 in Figure 1, showing the input and output shafts of the clutch, together with the clutch-tripping arm.

Figure 3 is a vertical section through the clutch mechanism of Figure 1, taken approximately along the line 3—3 thereof.

Figure 3a is a view taken substantially along the line 3a—3a of Figure 3 and looking in the direction of the arrows.

Figure 4 is a right side elevation view of the clutch as shown in Figures 2 and 3, with the cover plate removed and with the parts in the resting or idling position, wherein the clutch output shaft is halted.

Figure 5 is a view similar to Figure 4 but with the parts in the position occupied at the instant that the clutch-tripping arm is actuated.

Figure 6 is a view similar to Figures 4 and 5, but with the parts in the position wherein the clutch-tripping arm has been automatically returned to its original position during the operating cycle of the clutch.

Figure 7 is a view similar to Figures 4, 5 and 6, but with the parts in the position occupied just prior to the completion of a single revolution of the output shaft of the clutch.

Figure 8 is an elevation of the worm and worm wheel within the clutch, together with the ratchet, cam and spiral spring thereof.

Figure 9 is an enlarged perspective view of the retaining plate of the clutch.

Figure 10 is a top plan view of the worm wheel, ratchet and cam shown in Figure 8, with the worm and spiral spring removed.

Figure 11 is an enlarged perspective view of the locking plate associated with the retaining plate of Figure 9 inside the clutch.

Figure 12 is a vertical sectional view showing the ratchet and pawl with the spring pressing mechanism for causing the pawl to engage the ratchet, taken approximately along the line 12—12 in Figure 10.

Figure 12a is a view taken substantially on the line 12a—12a of Figure 12 and looking in the direction of the arrows.

Figure 13 is an oblique section through the pivotal connection between the clutch cam, the retaining plate and the locking plate, taken approximately along the line 13—13 in Figure 4.

Figure 14 is an exploded perspective view showing the clutch worm wheel, ratchet, ratchet pawl and accessory parts of the clutch mechanism shown in Figures 1 to 13, inclusive.

General arrangement

In general, the clutch of this invention consists of a casing having an input shaft driven by a motor, and an output shaft selectively connected by the clutch mechanism to the input shaft. A cam and ratchet mechanism within the clutch casing is controlled by a clutch-tripping arm in such a manner that when the clutch-tripping arm is shifted to start an operating cycle of the clutch, the output shaft is rotated by a predetermined amount, such as a complete revolution. Precisely at the end of this complete revolution the output shaft halts automatically. This is accomplished by the automatic disconnection of the ratchet mechanism within the clutch. At the same time, the clutch mechanism returns the clutch-tripping arm to its non-operating position so that it is ready to be shifted at any time in order to bring about another operating cycle of the clutch. Thus, while the motor shaft rotates the input shaft continuously, the output shaft rotates only when the clutch-tripping arm is shifted and then only for a single complete revolution.

This clutch is useful in connection with mechanisms wherein paper or other webs are to be fed by predetermined lengths, or machinery moved by predetermined amounts. The clutch is also useful in cooperation with any mechanism for bringing about a predetermined motion of an accurately defined amount, followed by a halting of the mechanism. In the copending Pfeiffer application, Ser. No. 258,014, filed February 23, 1939, this clutch is disclosed in cooperation with a manifolding machine, by the aid of which multiple copies of typed records are made by their being imprinted upon multiple paper webs between which the carbon ribbons are interleaved. This use of the clutch, however, is but one of the many possible applications thereof.

Clutch mechanism

Referring now to the drawings in detail, the clutch of this invention includes a casing 1 having a cover plate 2 screwed thereto, this cover plate carrying an output shaft bearing 3. This clutch is provided with an input shaft 4 to which power is applied...

shaft 5 is provided with a transverse socket 40 (Figure 12) for receiving the coil spring 35. The inner end of the output shaft 5 is rotatably supported in a socket 41 in the bearing member 3, secured to the cover plate 2 (Figure 3).

Disposed between the cover plate 2 and the clutch casing 1 is a supporting plate 42, carrying a pivot pin 43 entering the aligned apertures 44 and 45 in the locking plate 46 and retaining plate 47, respectively, (Figures 3, 9 and 11). The plates 46 and 47 are pendulum-shaped and are provided with apertures 48 and 49 forming internal cam surfaces. The aperture 48 is provided with an abrupt step 50 which is engageable by the portion 51 of the locking member 24. The aperture 48, however, is formed...

and input shaft 4 rotate continuously as long as the motor 31 is energized (Figure 1). When this occurs the worm 12, mounted on the input shaft 4, causes the worm wheel 13 to rotate continuously. Normally, however, the clutch parts are in the resting position (Figure 4). In this position the clutch output shaft 5 does not rotate because the contact portion 20 of the pawl 21 is forcibly held out of engagement with the steps 18 on the ratchet 17, thereby rendering the ratchet 17 incapable of driving the output shaft 5 through the pawl 21 mounted on the locking member 24. The reason that the pawl 21 is held out of engagement with the ratchet wheel 17 arises from the fact that its leading edge engages the step 50 on the edge of the aperture 48 in the locking plate 46 (Figures 11 and 14), the same step 50 being likewise engaged by the leading portion 51 of the locking member 24 (Figure 4). When the clutch-tripping arm 77 is lifted by the spring 79, this action rotates the shaft 66 clockwise (Figure 4) and swings the arm 65, link 61 and locking plate 46 to the right, moving the step 50 thereof out of engagement with the leading portions of the locking member 24 and pawl 21, respectively. The parts now occupy the positions shown in Figure 5.

In many installations the spring 79 is omitted as it tends to urge the clutch-tripping arm in a direction tending to operate the clutch and cause it to go through an operating cycle. In the mechanism shown in the above-mentioned Pfeiffer application, Ser. No. 258,014, filed February 23, 1939, the clutch-tripping arm 77 is forcibly held in its inoperative position by a latching device 77a, which is automatically released by the mechanism of the manifolding machine. Unless the clutch-tripping arm 77 is provided with such a latching device the coil spring 79 is preferably omitted, because it would otherwise tend to cause the clutch to repeat its cycle of operation indefinitely after the end of each preceding cycle of operation.

When the step 50 of the locking plate 46 is moved to the right, so as to release the locking member 24 and pawl 21 from engagement with the step 50, the contact portion 20 of the pawl 21 is pushed into the path of one of the steps 18 on the ratchet wheel 17, urged by the coil spring 35 and the spiral spring 32. The rotating ratchet wheel 17 immediately starts the clutch output shaft 5 in rotation by reason of its clutching engagement with the pawl portion 20, thereby rotating the pawl 21 and locking member 24 into the positions shown in Figure 6. Meanwhile, the leading portion 51 of locking member 24 in rotating, engages the left side of aperture 48 and thereby swings the locking plate 46 to the left, together with the link 61 and the arm 65. This rotates the shaft 66 counter-clockwise and automatically swings the clutch-tripping arm 77 downward into its inoperative resting position (Figure 5). The clutch-tripping arm 77 must now be engaged by a latching or detent device such as shown at 77a so as to prevent its return to the operating position, under the urge of the coil spring 79.

While this operation has been going on, the parts continue to rotate in clutching engagement until they reach the positions shown in Figure 7. At this time the pin 26 pushes the retaining plate 47 to the right, and the leading portions of the locking member 24 and pawl 21 engage the step 50 on the locking plate 46. This engagement causes the pawl 21 to rock around its pivot pin 22 and swing the contact portion 20 out of the path of the ratchet steps 18, thereby disconnecting the clutch output shaft 5 from operative engagement with the ratchet 17, and hence, out of operative connection with the clutch input shaft 4. The motor 31, clutch input shaft 4, worm 12, ratchet wheel 13 and ratchet 17 now rotate freely and idly without rotating the output shaft 5 again until the clutch-tripping arm 77 is manually shifted, or is automatically shifted by the coil spring 79 in the event that a latch or detent device is provided for the clutch-tripping arm 77. When the clutch-tripping arm 77 is shifted again the clutch output shaft 4 is again caused to execute a complete revolution, and then halt, in accordance with the action of the pawl and ratchet mechanism described above.

It will be understood that it is desired to comprehend within the invention such modifications as come within the scope of the claims and the invention.

Having thus fully described the invention, what is claimed as new and desired to be secured by Letters Patent, is:

1. In a clutch of the type adapted to cause the output shaft to rotate exactly one complete revolution or multiples thereof when the input shaft is continuously rotated, an input shaft, an output shaft, a ratchet member, a pawl member selectively engageable with said ratchet, one of said members being operatively connected with said input shaft and the other member with said output shaft, means for engaging said pawl with said ratchet, means comprising a pivotally mounted locking plate having an opening surrounding the output shaft, said opening provided with a step-like surface to engage the pawl for holding said pawl out of engagement with said ratchet when said locking plate is locked in one position to maintain said output shaft at rest, and means for shifting said locking plate to a different position to release said pawl for engagement with said ratchet to operatively connect said input shaft with said output shaft.

2. In a clutch of the type adapted to cause the output shaft to rotate exactly one complete revolution or multiples thereof when the input shaft is continuously rotated, an input shaft, an output shaft, a ratchet member, a pawl member selectively engageable with said ratchet, one of said members being operatively connected with said input shaft and the other member with said output shaft, means for engaging said pawl with said ratchet, means comprising a pivotally mounted locking plate having an opening surrounding the out-put shaft, said opening provided interiorly with a step-like surface to engage the pawl for holding said pawl out of engagement with said ratchet when said locking plate is locked in one position to maintain said output shaft at rest, said locking plate being shiftable to a different position to release said pawl for engagement with said ratchet to operatively connect said input shaft with said output shaft, and means comprising a tripping mechanism for moving said locking plate so as to release said pawl from engagement with said ratchet to cause said input shaft to rotate the output shaft a complete revolution or multiples thereof.

3. In a clutch, an input shaft, an output shaft out of line with the input shaft, a ratchet member, a pawl member selectively engageable with said ratchet, one of said members being operatively connected with said input shaft and the other member with said output shaft, means for engaging said pawl with said ratchet, means comprising a pivotally supported locking plate having an opening surrounding the out-put shaft, said opening provided interiorly with a step-like surface to engage the pawl for holding said pawl out of engagement with said ratchet when said locking plate is locked in one position to maintain said output shaft at rest, said locking plate being shiftable to a different position to release said pawl for engagement with said ratchet to operatively connect said input shaft with said output shaft, means comprising a tripping mechanism for moving said locking plate to a different position to release said pawl from engagement with said ratchet to cause said input shaft to rotate the output shaft a predetermined amount, and means responsive to the rotation of said output shaft a predetermined amount for automatically shifting said locking plate into position to bring about the disengagement of said pawl from said ratchet and stop the rotation of said output shaft when said output shaft has completed its cycle of rotation.

4. A clutch of the type adapted to cause the output shaft to rotate exactly one complete revolution or multiples thereof when the input shaft is continuously rotated comprising a casing enclosing one end of an input shaft driven by a prime mover, an output shaft selectively connected to said input shaft, a pawl and ratchet mechanism associated with said input and output shafts for operatively connecting the input shaft with the output shaft, means comprising a shiftable locking member having an opening surrounding the out-put shaft, said opening provided interiorly with a step-like surface to engage the pawl for maintaining the pawl and ratchet mechanism out of operative engagement with each other, means for urging said pawl into engagement with said ratchet, and means comprising a trip arm mechanism for shifting said locking member to a different position to that in which the pawl and ratchet mechanism are maintained out of operative engagement with each other to cause engagement of said pawl with said ratchet to start an operating cycle wherein the output shaft is rotated one complete revolution or multiples thereof by said input shaft.

5. A clutch comprising a casing enclosing one end of an input shaft driven by a prime mover, an output shaft selectively connected to said input shaft, said output shaft being angularly disposed with respect to the input shaft, a pawl and ratchet mechanism associated with said input and output shafts for operatively connecting the input shaft with the output shaft, means comprising a shiftable locking member having an opening surrounding the out-put shaft, said opening provided interiorly with a step-like surface to engage the pawl for maintaining the pawl and ratchet mechanism out of operative engagement with each other, means for urging said pawl into engagement with said ratchet, means comprising a trip arm mechanism for shifting said locking member to a different position from that in which the pawl and ratchet mechanism are maintained out of operative engagement with each other to cause engagement of said pawl with said ratchet to start an operating cycle wherein the output shaft is rotated a predetermined amount by said input shaft, and cam actuated means operatively associated with said locking member for shifting said locking member to its original locking position to effect the automatic disconnection of the ratchet and pawl mechanism so as to halt the rotation of the output shaft when the latter has rotated a predetermined amount.

6. A clutch comprising an input shaft, an output shaft, a ratchet wheel operatively connected to said input shaft, said output shaft being angularly disposed with respect to the input shaft, pawl means for selectively connecting said ratchet wheel to said output shaft to bring about the rotation of said output shaft, means comprising a swingable member having an opening surrounding said out-put shaft, said opening being provided interiorly with an abutment for coacting with said pawl means to prevent the rotation of said output shaft, and cam means associated with said pawl responsive to the rotation of said output shaft for moving said swingable locking member so as to cause said abutment to engage said pawl and thereby to bring about the disengagement of the pawl from the ratchet automatically when the output shaft carrying the pawl is rotated to a predetermined angular position.

7. A clutch comprising an input shaft, an output shaft, said output shaft being disposed ninety degrees with respect to the input shaft, a ratchet wheel operatively connected to said input shaft, pawl means for selectively connecting said ratchet wheel to said output shaft to bring about the rotation of said output shaft, means comprising a swingable member having an opening surrounding the out-put shaft, said opening provided interiorly with an abutment for coacting with said pawl means to prevent the rotation of said output shaft, cam means associated with said pawl responsive to the rotation of said output shaft for moving said swingable locking member so as to bring about engagement between said abutment and pawl to thereby effect the disengagement of the pawl from the ratchet automatically when the output shaft carrying the pawl is rotated to a predetermined angular position, and means comprising a latching device for retaining said swingable locking member in its locking position.

8. In a clutch of the type adapted to cause the output shaft to rotate exactly one complete revolution or multiples thereof when the input shaft is continuously rotated, a continuously rotatable input shaft, a ratchet, a member operatively connected thereto, an output shaft, means connected to said output shaft and rotatable therewith, said means having mounted thereon a pivoted pawl for coacting with said ratchet to drivingly connect said input shaft with said output shaft, means for urging said pawl into operative contact with said ratchet, means comprising a pivotally mounted shiftable locking member associated with said means on which said pawl is pivoted, said locking member surrounding the out-put shaft and having an engaging surface and being adapted to be moved to one position to bring about contact between said surface and the pawl to effect the disengagement of said pivoted pawl with said ratchet, means comprising a lever connected to said shiftable locking member for shifting said locking member to a different position to release said pawl whereby the same can pivot into engagement with said ratchet and drivingly connect said input shaft with said output shaft, and means for returning said locking member to its initial locking position to bring about the rocking of said pawl about its pivot and its disengagement from the ratchet to halt the rotation of the output shaft when said output shaft has been rotated one complete revolution or multiples thereof.

9. In a clutch of the type adapted to cause the output shaft to rotate exactly one complete revolution or multiples thereof when the input shaft is continuously rotated, a continuously rotatable input shaft, an output shaft, means comprising a ratchet and pawl mechanism for selectively operatively connecting said input shaft with said output shaft, a swingable cam locking plate member associated with said ratchet and pawl mechanism for retaining said mechanism in disengagement to prevent the rotation of said output shaft, said swingable member having an opening surrounding the out-put shaft, said opening provided with an engaging surface to contact said pawl, and being adapted to be moved from pawl-disengaging position to a different position for unlocking said ratchet and pawl mechanism and enabling the engagement of the pawl and ratchet to drivingly connect said input shaft with said output shaft, means comprising a cam responsive to one complete revolution of said output shaft for returning said locking member to its initial position for effecting the disengagement of said pawl from said ratchet and the stopping of said output shaft, and means comprising a spring and operatively associated with said pawl and ratchet mechanism for causing the engagement of said pawl with said ratchet.

10. In a clutch, a continuously rotatable input shaft, a ratchet wheel operatively connected thereto, an output shaft, a pawl operatively connected to said output shaft and selectively engageable with said ratchet wheel, a cam member connected to said output shaft, said pawl being pivotally mounted thereon, a locking element movable into and out of locking engagement with said cam member to maintain said pawl out of operative engagement with said ratchet wheel, means for releasing said locking element from locking engagement with said cam member, and means responsive to a predetermined rotation of said output shaft for shifting said locking element into engagement with said cam member and bringing about the disengagement of said pawl with said ratchet wheel, said locking element having a portion engageable with said pawl for selectively holding said pawl out of engagement with said ratchet wheel.

WILLIAM C. PFEIFFER.